United States Patent Office.

HENRY M. RAU, OF HANOVER, PENNSYLVANIA.

MANUFACTURE OF TANNIN EXTRACTS.

SPECIFICATION forming part of Letters Patent No. 376,345, dated January 10, 1888.

Application filed March 14, 1887. Serial No. 230,854. (No specimens.)

*To all whom it may concern:*

Be it known that I, HENRY M. RAU, a citizen of the United States, residing in the borough of Hanover, in the county of York and State of Pennsylvania, have invented certain new and useful Improvements in the Manufacture of Tannin Extracts; and I do hereby declare the following to be a full, clear, and exact description of the invention, such as will enable others skilled in the art to which it appertains to make and use the same.

My invention relates to tannic extracts.

My object is to remove from liquors or extracts obtained from vegetable products which contain tannin, either in whole or in part, certain objectionable coloring-matters and other ingredients which exert an undesirable influence when the liquors or extracts are applied for tanning and dyeing or the like, leaving the tannin behind and in a refined and decolorized state.

With this object in view my invention consists in treating liquors or extracts containing both tannin and certain objectionable ingredients—such as coloring-matters or other impurities—with hydrosulphurous acid ($H_2SO_2$) or compounds thereof, by the action of which the objectionable ingredients will be reduced, decolorized, and converted into insoluble products, and as such can be removed from the liquor by filtration or otherwise, the tannin remaining in the liquor refined and decolorized, which liquor may then be evaporated to the required degree of strength and consistence.

The invention also consists in the refined tannin liquor or extract so produced.

It is well known that the majority of vegetable products which contain tannin contain also certain coloring-matters and other ingredients which exert an undesirable influence when these products are applied for tanning and dyeing, &c. In the ordinary mode of manufacturing extracts of such products, whether by boiling or percolating with water, these coloring-matters and other ingredients are extracted at the same time with the tannin and remain in the liquors or finished extracts.

My invention is intended to remove from the liquors obtained by extracting such vegetable products, either wholly or in great part, the objectionable coloring matters and ingredients other than the tannin, which remains in the liquor in the refined and decolorized state, the refined and decolorized tannin liquors then to be evaporated to the required degree of strength and consistence.

My invention is based upon the reducing and decolorizing properties possessed by hydrosulphurous acid ($H_2SO_2$) and compounds thereof, by the action of which upon liquors containing both tannin and coloring-matters the latter are reduced, decolorized, and converted into insoluble products, and as such removed by filtration or other mechanical means from the liquor, which thereafter contains the tannin in the refined and decolorized state.

The hydrosulphurous acid ($H_2SO_2$) or compound thereof need not be prepared pure for this purpose, but may be generated by the reaction of certain chemicals during the process of treating the liquors.

The process is applicable to all materials in which the tannin is accompanied by coloring-matters, among others to sumac, oak-bark, hemlock-bark, and chestnut-wood.

In carrying out my invention I take, for example, ten thousand pounds of sumac liquor at 20° Twaddle, cold or lukewarm, as obtained by extracting sumac with water. To this quantity, placed in a suitable vessel provided with a stirrer and capable of being tightly closed, I add one hundred and fifty pounds of zinc dust. After this has been thoroughly mixed with and suspended in the liquor, I add, furthermore, five hundred pounds of a concentrated solution of bisulphite of soda. The vessel is thereupon closed and the stirrer operated for from three to four hours. The chemical reaction which ensues between zinc dust and bisulphite of soda produces the hydrosulphurous compounds of zinc and soda, which in turn act upon the coloring-matters contained in the liquor in such wise that the latter are precipitated in connection with hydroxide of zinc and some unaltered zinc dust. At the same time certain other impurities of the liquor, not thoroughly known but generally designated as "gummy matters," are carried down as an insoluble precipitate. The precipitated substances are next separated from the liquor by means of filtering-bags or filter-presses, but preferably the latter, or by centrifugal apparatus. The clarified liquor generally contains an excess of the hydrosulphurous compounds, to decompose which it is boiled in open vats by directly-injected steam until the evolution of sulphurous vapors has entirely ceased. During this operation a further precipitation takes place. After the precipitated matter has been removed by filtration or centrifugation the resultant liquor contains the tannin in its refined and decolorized state. It is then generally concentrated by evaporation, preferably in a vacuum-pan, to the strength and consistence desired. A small quantity of sulphate of soda remains in the liquor as the result of the chemical reactions, but it is not detrimental for any of the uses to which tannic extracts are industrially applied.

In place of zinc dust, metallic zinc in any other form may be employed, but the quantity required is larger and the process slower. In place of bisulphite of soda, the bisulphites of all alkalies and alkaline earths may be employed.

I do not limit myself to the proportions, conditions of temperature, degrees of concentration, duration of treatment, nor special manipulation herein described, as these may be varied without affecting the principle of my invention; nor do I confine the application of the invention to sumac only.

Having thus fully described my invention, what I claim as new, and desire to secure by Letters Patent, is—

1. In producing refined and decolorized tannic extracts, the process of placing the objectionable coloring-matters or ingredients other than the tannin in condition for removal from the liquor containing all, which consists in treating the liquor with hydrosulphurous acid, ($H_2SO_2$,) substantially as described.

2. In the manufacture of refined and decolorized tannic extracts, the process of removing objectionable ingredients from the liquor, which consists in treating the liquor with hydrosulphurous acid ($H_2SO_2$) and then separating the objectionable ingredients from the tannin by filtration or other means, substantially as set forth.

3. The process of producing refined and decolorized tannic extracts, which consists in treating the liquor containing the same with hydrosulphurous acid, ($H_2SO_2$,) then separating coloring-matters, objectionable ingredients, and impurities from the tannin by filtration or other means, and finally concentrating the liquor containing the refined and decolorized tannin, substantially as described.

4. The refined, decolorized, and concentrated tannic extract containing hydrosulphurous acid, as described.

In testimony whereof I affix my signature in presence of witnesses.

HENRY M. RAU.

Witnesses:
R. M. RUSSELL,
A. F. BARKER,
R. G. DYRENFORTH.